US007191350B2

(12) United States Patent
Tani

(10) Patent No.: US 7,191,350 B2
(45) Date of Patent: Mar. 13, 2007

(54) INSTRUCTION CONVERSION APPARATUS AND INSTRUCTION CONVERSION METHOD PROVIDING POWER CONTROL INFORMATION, PROGRAM AND CIRCUIT FOR IMPLEMENTING THE INSTRUCTION CONVERSION, AND MICROPROCESSOR FOR EXECUTING THE CONVERTED INSTRUCTION

(75) Inventor: Takenobu Tani, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 546 days.

(21) Appl. No.: 10/342,349

(22) Filed: Jan. 15, 2003

(65) Prior Publication Data

US 2003/0182589 A1 Sep. 25, 2003

(30) Foreign Application Priority Data

Jan. 30, 2002 (JP) ............................ 2002-021479

(51) Int. Cl.
*G06F 1/26* (2006.01)
*G06F 1/28* (2006.01)
*G06F 1/32* (2006.01)

(52) U.S. Cl. ...................... 713/324; 713/320; 713/322; 713/323

(58) Field of Classification Search ..................... None
See application file for complete search history.

(56) References Cited

U.S. PATENT DOCUMENTS

| | | | | |
|---|---|---|---|---|
| 5,557,557 | A * | 9/1996 | Frantz et al. | 713/321 |
| 5,790,874 | A * | 8/1998 | Takano et al. | 713/320 |
| 5,790,877 | A * | 8/1998 | Nishiyama et al. | 713/323 |
| 6,105,141 | A | 8/2000 | Hanlon et al. | |
| 6,438,700 | B1 * | 8/2002 | Adusumilli | 713/323 |
| 6,564,328 | B1 * | 5/2003 | Grochowski et al. | 713/320 |
| 6,625,740 | B1 * | 9/2003 | Datar et al. | 713/324 |
| 6,775,787 | B2 * | 8/2004 | Greene | 713/340 |

* cited by examiner

*Primary Examiner*—James K. Trujillo
(74) *Attorney, Agent, or Firm*—McDermott Will & Emery LLP

(57) ABSTRACT

An instruction conversion apparatus for optimizing an instruction program formed of a plurality of instructions to be suitable for execution by a microprocessor that has a plurality of hard ware resources. The apparatus includes a power control information analysis unit for detecting a power controllable hardware resource that does not operate for a certain specific instruction region in the instruction program while the microprocessor is at work, and a power control instruction providing unit for providing the instruction program with an instruction regarding the power control based on the result of the detection made by the power control information analysis unit.

4 Claims, 13 Drawing Sheets

Fig. 2

202 Hardware resource

201 Instruction mode

| Instruction mode | Memory Read Operation | Memory Write Operation | Processor A Operation | Processor B Operation | Branch Unit A Operation | Block A Operation | Block B Operation | Block C Operation | Peripheral Interface A Operation | Parallel Instruction Decode Unit | Data Register R0-R15 | Data Register R16-R31 | Address Processing Unit | Spot Value Unit |
|---|---|---|---|---|---|---|---|---|---|---|---|---|---|---|
| ADD Rx,Ry,Rz | 0 | 0 | 1 | 0 | 0 | 0 | 0 | 0 | 0 | 0 | 1 | 1 | 0 | 0 |
| ADD Rx,MEMy,MEMz | 1 | 0 | 1 | 0 | 0 | 1 | 0 | 0 | 0 | 0 | 1 | 1 | 1 | 0 |
| ADD Rx,Ry,imm | 0 | 0 | 1 | 0 | 0 | 0 | 0 | 0 | 0 | 0 | 1 | 0 | 0 | 1 |
| LD Ra,MEMy | 1 | 0 | 0 | 0 | 0 | 1 | 0 | 0 | 0 | 0 | 0 | 0 | 0 | 0 |
| LD Ra,MEMy::ADD Rx,Ry,Rz | 1 | 0 | 1 | 0 | 0 | 1 | 0 | 0 | 0 | 1 | 1 | 1 | 0 | 0 |
| STR Ra,MEMy | 0 | 1 | 0 | 0 | 0 | 1 | 1 | 0 | 0 | 0 | 1 | 0 | 0 | 0 |
| MUL Rx,Ry,Rz | 0 | 0 | 0 | 1 | 0 | 0 | 0 | 0 | 0 | 0 | 1 | 1 | 0 | 0 |
| IO ADDR | 0 | 0 | 0 | 0 | 0 | 0 | 0 | 0 | 1 | 0 | 0 | 0 | 1 | 1 |
| JUMP Rx | 0 | 0 | 0 | 0 | 1 | 0 | 0 | 0 | 0 | 0 | 1 | 0 | 0 | 0 |
| LOOP N | 0 | 0 | 0 | 0 | 1 | 0 | 0 | 1 | 0 | 0 | 0 | 0 | 0 | 1 |
| : | : | | | | | | | | | | | | | |

Instruction-wise Hardware Resource Table

Fig. 3

3 0 1 Instruction mode

| |
|---|
| LD R1,Mem(A0) |
| LD R1,Mem(A1) |
| SUB R0,R1,Oxffff |
| ADD R2,R5,R7 |
| MUL R3,R0,R2 |
| STR Mem(A4),R3 |
| LD R4,Mem(A5) |

3 0 2 Hardware resource

| Memory Read Operation | Memory Write Operation | Processor A Operation | Processor B Operation | Branch Unit A Operation | Block A Operation | Block B Operation | Block C Operation | Peripheral Interface A Operation | Parallel Instruction Decode Unit | Data Register R0-R15 | Data Register R16-R31 | Address Processing Unit | Spot Value Unit |
|---|---|---|---|---|---|---|---|---|---|---|---|---|---|
| 1 | 0 | 0 | 0 | 0 | 1 | 0 | 0 | 0 | 0 | 1 | 0 | 1 | 0 |
| 1 | 0 | 0 | 0 | 0 | 1 | 0 | 0 | 0 | 0 | 1 | 0 | 1 | 0 |
| 0 | 0 | 1 | 0 | 0 | 0 | 0 | 0 | 0 | 0 | 1 | 0 | 0 | 1 |
| 0 | 0 | 1 | 0 | 0 | 0 | 0 | 0 | 0 | 0 | 0 | 0 | 0 | 0 |
| 0 | 0 | 0 | 1 | 0 | 0 | 0 | 0 | 0 | 0 | 1 | 0 | 0 | 0 |
| 0 | 1 | 0 | 0 | 0 | 1 | 1 | 0 | 0 | 0 | 1 | 0 | 1 | 0 |
| 1 | 0 | 0 | 0 | 0 | 1 | 0 | 0 | 0 | 0 | 1 | 0 | 1 | 0 |

Instruction-wise Operating
Hardware Resource Data

Fig. 4

| Instruction | | Memory Read Operation | Memory Write Operation | Processor A Operation | Processor B Operation | Branch Unit A Operation | Block A Operation | Block B Operation | Block C Operation | Peripheral Interface A Operation | Parallel Instruction Decode Unit | Data Register R0-R15 | Data Register R16-R31 | Address Processing Unit | Spot Value Unit |
|---|---|---|---|---|---|---|---|---|---|---|---|---|---|---|---|
| LD | R1,Mem(A0) | 1 | 0 | 0 | 0 | 0 | 1 | 0 | 0 | 0 | 0 | 1 | 0 | 1 | 0 |
| LD | R1,Mem(A1) | 1 | 0 | 0 | 0 | 0 | 1 | 0 | 0 | 0 | 0 | 1 | 0 | 1 | 0 |
| SUB | R0,R1,Oxffff | 0 | 0 | 1 | 0 | 0 | 0 | 0 | 0 | 0 | 0 | 1 | 0 | 0 | 1 |
| ADD | R2,R5,R7 | 0 | 0 | 1 | 0 | 0 | 0 | 0 | 0 | 0 | 0 | 0 | 0 | 0 | 0 |
| MUL | R3,R0,R2 | 0 | 0 | 0 | 1 | 0 | 0 | 0 | 0 | 0 | 0 | 1 | 0 | 0 | 0 |
| STR | Mem(A4),R3 | 0 | 1 | 0 | 0 | 0 | 1 | 1 | 0 | 0 | 0 | 1 | 0 | 1 | 0 |
| LD | R4,Mem(A5) | 1 | 0 | 0 | 0 | 0 | 1 | 0 | 0 | 0 | 0 | 1 | 0 | 1 | 0 |

```
LD    R1,Mem(A0)
LD    R1,Mem(A1)
SET PCR,  #Memory_Read_Stop
SUB   R0,R1,Oxffff
ADD   R2,R5,R7
MUL   R3,R0,R2
STR   Mem(A4),R3
CLR PCR,  #Memory_Read_Stop
LD    R4,Mem(A5)
```

Fig. 7

```
LD    R1,Mem(A0)
LD    R1,Mem(A1)
SUB   R0,R1,Oxffff      :: SET PCR,  #Memory_Read_Stop
ADD   R2,R5,R7
MUL   R3,R0,R2
STR   Mem(A4),R3        :: CLR PCR,  #Memory_Read_Stop
LD    R4,Mem(A5)
```

Conventional Control through Hardware

Conventional Control through Software

INSTRUCTION CONVERSION APPARATUS AND INSTRUCTION CONVERSION METHOD PROVIDING POWER CONTROL INFORMATION, PROGRAM AND CIRCUIT FOR IMPLEMENTING THE INSTRUCTION CONVERSION, AND MICROPROCESSOR FOR EXECUTING THE CONVERTED INSTRUCTION

BACKGROUND OF THE INVENTION (1) Field of the Invention

The present invention relates to an instruction conversion apparatus and a method of converting an instruction which provide an object program with a power control information, a program and a circuit for implementing the instruction conversion, furthermore a microprocessor for executing the converted instruction; in microprocessors (including microcomputer, microcontroller and digital signal processor) which read an object program out of an instruction storage unit (instruction memory, instruction cache, etc.), decode it at a decoder to control the hardware resources (processing unit, input unit, output unit, memory unit, control unit, etc) in accordance with the contents and proceed a sequence processing.

(2) Description of the Background Art

Among the microprocessors, there have been two methods of controlling the electric power for saving the power consumption; one method is that through hardware, the other is that through software.

First, a conventional method of controlling the power through hardware is described. In a typical operation of a microprocessor, an instruction decoder acquires instruction code from an instruction memory unit along with progress of a program, decodes the instruction code, and controls the processing operations in accordance with respective instructions. In the power control through hardware, an instruction decoder for extracting information regarding the power control is built in the microprocessor.

FIG. 14 shows an example of circuitry for controlling the power in a microprocessor through hardware. As soon as an instruction decoder 1401 receives from an instruction memory 1402 an instruction code which instructs addition between registers, the decoder judges that data memory and the peripheral interface will not be put into operation while the relevant instruction code is being executed. Every time when the instruction decoder 1401 receives an instruction of addition between registers, it issues to respective circuits an instruction to halt operation of data memory, peripheral interface, etc. Thus the power control is conducted with respect to the instruction of addition between registers. Besides, the decoder is structured so that it can decode the power control information in accordance with kinds of instruction codes, such as a subtraction instruction, a read out instruction, etc. Thereby, power control instruction is issued to reduce the power consumption, at each time when various instruction codes are decoded.

Next, a conventional method of controlling the power through software is described. In the method of control through software, a user describing a program judges as to which of the hardware resources can be halted while microprocessor is executing an object program, and writes a power control instruction direct in the program.

FIG. 15 is an example of program for the power control in a microprocessor through software. In the present example, the data memory is not used in a region 1501. User inserts an instruction to halt (decrease the power of) the data memory at a point 1502, and an instruction to release (increase the power of) the data memory from the halt at a point 1503 which is just before the data memory is put into operation again. Thus the data memory is halted in the region 1501 by the above two instructions. Although only a data memory is exemplified in the above, any other circuits of a microprocessor can be controlled in this way; the circuits including data register, data bus, peripheral interface, even those of the circuit element level e.g. AND. Even in the power control method through software, the real power control within a microprocessor is conducted by writing a power control instruction, which has been decoded at an instruction decoder, in a power control register.

In a power control method through hardware, the decoder needs to be structured so that it can decode power control information corresponding to various instruction codes. This naturally expands the size of hardware to a large scale, if a thorough power control is to be performed. Furthermore, if there are many kinds of decodable instructions, power consumption needed for the decoding operation increases. This might result in an increased total power consumption of a microprocessor. Still further, since a power control information can only be extracted at each unit of instruction codes, it is not possible to perform an advanced power control to a succeeding instruction.

In a power control method through software, user is requested to judge as to what time the power control is to be started and ended, and write a power control instruction accordingly into a program. Thus, the development burden of a user is substantial. Furthermore, when number of the point of control increases, it turns out to be difficult to write thorough instructions. Still further, targets of the power control may differ depending on structure of a microprocessor, viz. the memory structure, number of peripheral interface ports, etc. In such a case, an exclusive program will be needed by each of the models. So, it is difficult to share a program in common, or use a program also for other applications. Furthermore, when a number of the power control instructions are written at a point of multiloop or frequent execution, speed of program execution goes down.

SUMMARY OF THE INVENTION

The present invention addresses the above problems and aims to implement a thorough power control, without inviting an increased hardware size, without causing too much development burden at user, while securing a wide-usability of software.

The above objective is accomplished by an instruction conversion apparatus, which statically analyzes a program when it is compiled or assembled and provides the program with an instruction regarding the power control based on the result of analysis.

The above instruction conversion apparatus can be easily-implemented; an information as to which of the hardware resources are put into operation, or not, by an instruction among the instruction program is stored beforehand in an instruction-wise hardware resource table, and thereby detecting a certain specific hardware resource that dose not operate for a certain specific instruction region while a microprocessor is at work.

As to the practical method of providing a power control instruction; it can be made by inserting an instruction regarding the power control, or by replacing an instruction which does not contain a power control instruction with an instruction containing the power control instruction.

In a method of saving the power consumption which is to be implemented by inserting the instructions, the processing speed might be slowed down by increased cycle counts when many instructions are inserted. And the code size increases as a result of inserted instructions. Such drawbacks, however, can be improved by structuring the above instruction conversion apparatus so that a user can determine the level of power control by an option at the compilation or assembling. Namely, the code size and the power control may be adjusted by selecting a number of inserted power control instructions among several steps.

Other objective of the present invention is to analyze an object program prior to decoding and provide an instruction regarding the power control, thereby offering an instruction conversion circuit that can realize a low power consumption while controlling the increase of hardware within a certain scale.

The above objective can be implemented by an instruction conversion circuit, which circuit comprises an instruction-wise hardware resource memory for storing beforehand an information about whether a certain specific hardware resource is put into operation by an instruction code among an object program which is to be executed by a microprocessor; a power control information analysis circuit for detecting, based on the information stored in said instruction-wise hardware resource memory, a hardware resource that does not operate for a certain instruction region while the microprocessor is at work; and a power control instruction providing circuit for providing the object program with, based on the results detected by the instruction-wise hardware resource analysis circuit, an instruction regarding the power control.

Still other objective of the present invention is to offer a microprocessor which can execute a power-optimized object program generated by the above instruction conversion apparatus without incurring an operation error, even when a special processing such as interruption, branching, exception, etc. has arisen.

The above objective can be implemented by providing the microprocessor with a condition reset circuit that resets, at the time when any of the interruption, branching, exception is detected, condition of the power control register to the initial state in which all of the hardware resources operate.

BRIEF DESCRIPTION OF THE DRAWINGS

FIG. 2 is an example of instruction-wise hardware resource table in the present invention.

FIG. 3 is an example of data on instruction-wise hardware resources put into operation.

FIG. 4 is an example of power control information detection unit in the present invention.

FIG. 5 shows an example of power control instruction inserted in an instruction program.

FIG. 7 shows an example where an instruction among instruction program is replaced with an instruction containing a power control instruction.

DESCRIPTION OF THE PREFERRED EMBODIMENTS

Figure 1:
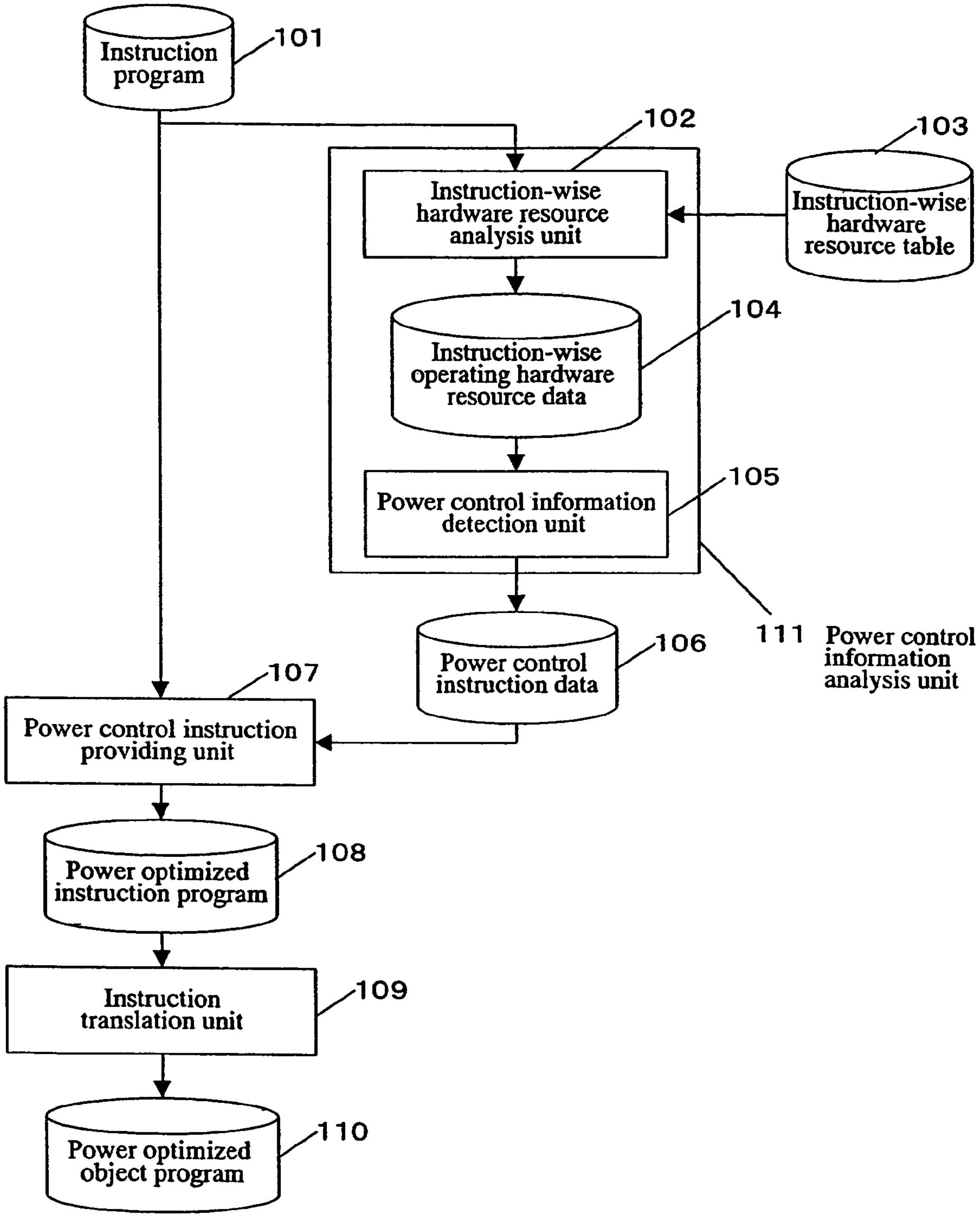
FIG. 1 shows an instruction conversion apparatus in accordance with a first exemplary embodiment of the present invention.

In the following passages, an instruction row for operating a microprocessor is referred to as "instruction program", regardless of the language used. A machine language row before decoding, generated as the result of translation of an instruction program into machine language, for execution by a microprocessor is referred to as "object program". And "object program" is a kind of "instruction program". All the intermediate programs which are created when generating an object program from an instruction program are also included in the instruction program.

Now, a first exemplary embodiment of the present invention is described in detail referring to the drawings.

Total Structure of Instruction Conversion Apparatus

FIG. 1 shows an instruction conversion apparatus in accordance with a first exemplary embodiment of the present invention. In the drawing, an instruction program 101 is for execution by a microprocessor. The program 101 may either be an instruction row described in mnemonic or an instruction row described by a high-level language such as the C language or the FORTRAN. In the present embodiment, an instruction row described with mnemonic is used as an example.

An instruction-wise hardware resource table 103 stores in advance information as to which of the hardware resources in a microprocessor are put into operation by a certain specific instruction.

An instruction-wise hardware resource analysis unit 102 receives instruction program 101 as the input, and refers, at each of the instructions among the instruction program 101, to the instruction-wise hardware resource table 103 in order to extract information as to which of the hardware resources will be put into operation. It outputs an instruction-wise operating hardware resource data 104.

A power control information detection unit 105 receives the instruction-wise operating hardware resource data 104 as the input, and judges, after making a time sequential analysis, as to where a power control instruction such as halting or resuming a hardware resource is to be inserted for reducing the power consumption. It outputs a power control instruction data 106.

Based on the power control instruction data 106, a power control instruction providing unit 107 provides the instruction program 101 with an instruction for halting (decreasing the power of a hardware resource, resuming (increasing the power of) the hardware resource or the like instruction. The power control instruction providing unit generates a power optimized instruction program 108.

Contents of the power optimized instruction program 108 generated by the power control instruction providing unit 107 are put into an instruction translation unit 109. The instruction translation unit 109 generates and outputs a power optimized object program 110, which is a machine language instruction row to be executed by a microprocessor.

Detailed Structure of Instruction-wise Hardware Resource Table

The instruction-wise hardware resource table 103 is described referring to FIG. 2. The table 103 in the present embodiment is a two-dimensional table consisting of a field 201 of instruction mode and a field 202 showing the hardware resource in a microprocessor. The numerical values in the table represent whether a certain hardware resource operates or not when an instruction mode is executed. Numeral "1" in the table indicates that the relevant hardware resource operates, while numeral "0" indicates that it does not operate. In the "ADD Rx, Ry, Rz " case, which is an addition instruction between registers, only the "Processor A operation", "Data register R 0–R 15" and "Data register R 16–R 31" operate while a microprocessor is at work. So, the corresponding spaces of the table are filled with numeral "1". Since rests of the hardware resources do not operate, the corresponding spaces of the table are filled with numeral "0". Likewise, for the "LD Ra, MEMY", which is a memory read instruction, only the "Memory read operation" and "Block A operation" corresponding to the spaces filled with numeral "1" are put into operation. The absolute values here, "0" and "1", do not bear in themselves a material meaning, but the point of significance is to provide an operation information in the form of a table.

Description on Operation of Instruction-wise Hardware Resource Analysis Unit

Referring to FIG. 3, operation of the instruction-wise hardware resource analysis unit 102 is described, using an instruction program 301 as an example. FIG. 3 shows an instruction-wise operating hardware resource data 104 in the present embodiment. Upon receiving the instruction program 301 as input, the instruction-wise hardware resource analysis unit 102 conducts at each of the instructions a pattern correspondence search with the instruction mode field 201 of instruction-wise hardware resource table 103. The search is performed to judge an instruction mode to which the relevant instruction corresponds, and outputs the result of judgment in the form shown as 302. Among the hardware resources listed in 302, those corresponding to numeral "1" operate while a microprocessor is at work. The instruction-wise hardware resource analysis unit 102 conducts the above analysis at each of the instructions among the instruction program, and generates an instruction-wise operating hardware resource data 104.

Operation of Power Control Information Detection Unit

Referring to FIG. 4, operation of the power control information detection unit 105 is described. The power control information detection unit 105 analyzes in the direction of instruction (time sequential direction) the instruction-wise operating hardware resource data 104 delivered from instruction-wise hardware resource analysis unit 102, as to whether a hardware resource operates or not. A method of detecting the continuing "0" is described as an example. In the instruction-wise operating hardware resource data 104 in the present embodiment, the information "0" indicates that a microprocessor does not put the relevant hardware resource into operation at the execution of an instruction. The power control information detection unit 105 can detect a hardware resource that does not operate for a certain specific instruction region, by searching the instruction-wise operating hardware resource data 104 to detect the "0" which continues for e.g. three or more instruction regions.

A case of detecting a hardware resource which does not operate for three or more instruction regions is described using the "Memory Read Operation" as an example. In the data row 401 corresponding to "Memory Read Operation", the "Memory Read Operation" is not needed during a term of four instructions, from the SUB instruction to the STR instruction. The power control information detection unit 105 detects it. Information regarding the detected hardware resource and the haltable region is delivered as the power control instruction data 106 to the power control-instruction providing unit 107.

An Example of Power Control Instruction Providing Unit

The power control instruction providing unit 107 is described using the same instruction program shown in FIG. 4 as an example. FIG. 5 shows an example of inserted power control instruction. As seen in FIG. 5, the power control instruction providing unit 107 has inserted, based on the power control instruction data 106 delivered from the power control information detection unit 105, an instruction code which requests to halt (reduce the power of) the circuit regarding "Memory Read Operation" immediately before the SUB instruction, and an instruction which requests to resume operation (increase the power) of the circuit immediately after the STR instruction. Thereby, it can halt the function regarding "Memory Read Operation" for the above region, without needing any decoding at each instruction. Thus the electric power that should otherwise be consumed for the "Memory Read Operation" is saved.

The example shown in FIG. 4 uses no "Memory Write Operation" for the three instruction regions from SUB instruction to MUL instruction. In the present embodiment, by detecting the above information, the power control can be conducted at an upper stream stage than a case where only the power control is conducted for each of the hardware resources. Namely, not only providing an instruction program with control instruction regarding "Memory Read Operation" and "Memory Write Operation", also a control instruction for completely halting the memory as well as the memory control circuit itself can be provided.

The above instruction conversion apparatus is implemented in the form of a computer program, and offered to a microprocessor user as an assembler program. By simply compiling or assembling an instruction program 101, the user can provide as far as a power optimized object program 110. In this way, a user may simply describe an instruction program and assemble it without having any specific regard for the power control in mind, and, as the result, the power consumption of a microprocessor becomes lower than that in the conventional ones.

Method of Power Control In Microprocessor

Figure 6:
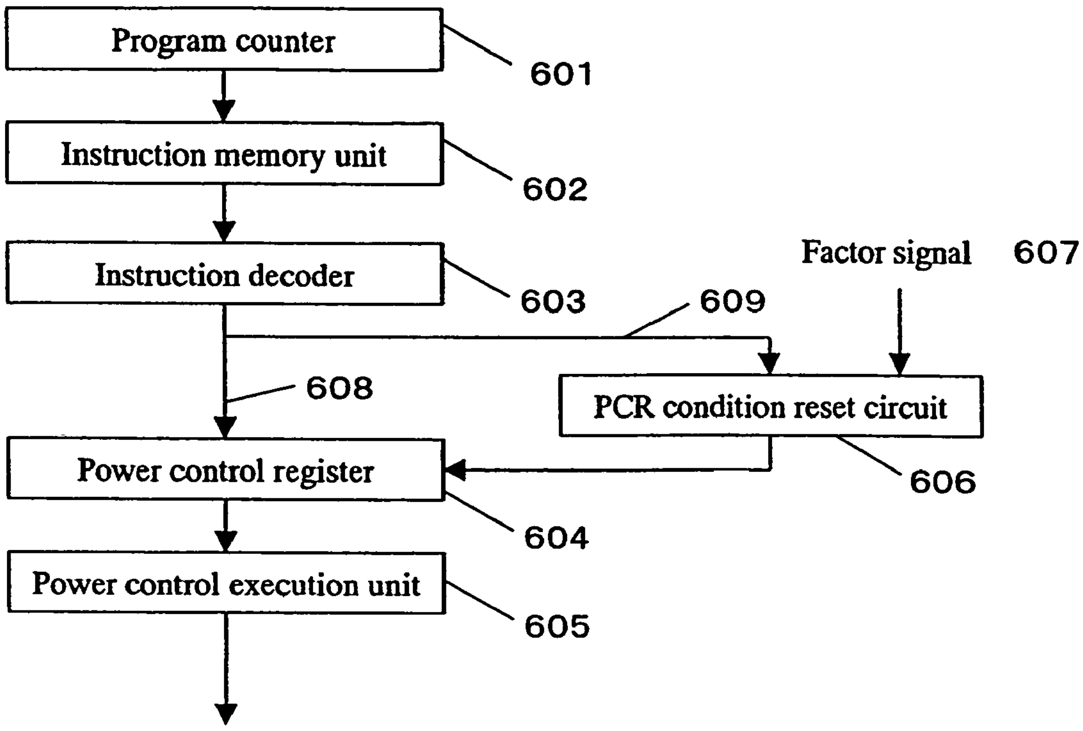
FIG. 6 shows a microprocessor in accordance with a first exemplary embodiment of the present invention.

The power consumption is reduced from the conventional by executing a power optimized object program 110 generated by the above-described instruction conversion apparatus. FIG. 6 shows the structure of a microprocessor in accordance with the present embodiment.

An instruction memory unit 602 stores a power optimized object program 110 which is generated by an instruction conversion apparatus in the present embodiment. A program counter 601 specifies address of an instruction which is to be executed next in a microprocessor. An instruction decoder 603 acquires from the instruction memory unit 602 an instruction code at the address specified by the program counter 601, and decodes it. An instruction regarding the power control decoded by the instruction decoder 603 is written (608) in a power control register 604. A power control execution unit 605 conducts, depending on condition of the power control register 604, the power control in a microprocessor (halt the clock, change the clock frequency, power-off, change the power supply voltage, suppress the signal variation, etc.). When an instruction to halt data memory, for example, is decoded by the instruction decoder 603, an instruction to halt data memory is written in the power control register 604. Then the microprocessor refers to condition of the power control register 604 prior to the executing, and can halt the data memory. If the memory is used again after the halt, an instruction to release the halt is again written in the power control register 604. Then the microprocessor refers to condition of the power control register 604 prior to the executing, and releases the memory halt.

Namely, by delivering a power optimized object program 110 to the instruction decoder 603, taking out an instruction regarding the power control and writing it in the power control register 604, a power control can be thoroughly conducted without increasing the hardware size, and power consumption of a microprocessor can be reduced.

In a case when a special instruction is given to a microprocessor, the microprocessor might cause an operation error as a result of executing the power optimized object program 110. Such a situation is described in detail below.

During the normal program execution, sequence of executing the instruction has already been fixed. So, by decoding a power optimized object program 110 the instruction regarding power control can be written precisely in the power control register 604. However, when a special instruction, e.g. interruption, branch, exception, etc. has arisen, the sequence of instruction execution goes to be different from the normal sequence; program is not necessarily executed in accordance with the written order. Namely, even when an ADD instruction is to be provided according to the written order, an interruption might require a STR instruction, for example. In such a case, an instruction to use a memory might come as a result of the special instruction, interruption, branch, exception; although the power control register 604 is set to halt a memory after a power optimized object program 110 is decoded. Then, the memory fails to operate, and the microprocessor might not operate normally.

In order to prevent the above situation to happen, a microprocessor in the present embodiment is provided with a PCR condition reset circuit 606. Thereby, the microprocessor does not cause an operation error and can perform a thorough power control, even when a special instruction is given.

As soon as a factor signal 607, interruption, branch, exception, is detected, the PCR condition reset circuit 606 specifies the condition of power control register 604 to be in a state where all of the hardware resources are put into operation (hereinafter referred to as prearranged value). The factor signal 607 can be a signal for exceptionally processing a calculation result (e.g. a signal requesting an exception for an overflowing result), a signal requesting interruption of microprocessor itself (e.g. a DMA transfer interruption, a timer interruption and the like signals raising a request according to the contents), an input signal delivered from outside (e.g. a signal requesting change of the external terminal), etc. When the power control register 604 is set to the predetermined value, a microprocessor can put all the hardware resources into operation. Thus, the microprocessor does not cause an operation error even when interruption, branch, exception or the like special instruction has arisen.

Although the foregoing descriptions have been made based on a first exemplary embodiment of the present invention, it is not the intention of the present invention to limit the scope of application to the above-described examples.

The instruction conversion apparatus in the first embodiment may be offered to a user as a compiler, in a case where a high-level language such as the C language, the FORTLAN is used at the user. Thus a user can describe a program easier by using a high-level language.

An instruction conversion apparatus in the first embodiment can be offered as a separate power control program other than an assembler or a compiler. By executing the power control program, a user may first provide a power optimized instruction program 108 and then a power optimized object program 110 by assembling. In this case, a user can easily confirm where a power control instruction is provided, by comparing an instruction program 101 described by user with the power optimized instruction program 108.

A power control information analysis unit 111 is not limited to the above-described configuration. Any unit would do, in so far as it is capable of detecting a power-controllable instruction region through a static analysis of instruction program. For example, the instruction region needing a power control which is detected by the power control information detection unit 105 is not necessarily required to be consisting of more than three regions; but it can be an instruction region consisting of one or more regions, which may be determined at option depending on a power control level that is optimum to respective application programs and systems operating at a microprocessor.

A power control instruction providing unit 107 is not limited to the one which inserts an instruction as described in the above. Any unit would do in, so far as it provides a power control information based on the power control instruction data 106. The power control instruction providing unit 107 may be the one which is formed as shown in FIG. 7, for example. Namely, while FIG. 5 shows an exemplary embodiment where a new instruction is inserted at the power control instruction providing unit 107, if an instruction containing a power control information is defined beforehand at the instruction specification of a microprocessor, a certain already-existing instruction can be replaced with a separate instruction which contains power control information as shown in FIG. 7. In the latter case, there is no increase in the operation cycle caused as a result of insertion of additional instruction during operation of a microprocessor. So, the power control can be implemented without accompanying a deteriorated speed.

It is of course possible to conduct a replacement if an instruction containing power control information is already defined, while conducting an insertion for the instruction which is not defined.

The PCR condition reset circuit 606 can be any circuit, in so far as it brings a microprocessor to a normal operating condition. For example, although the reset circuit in the first embodiment is detecting the interruption, branching and exception, it may be the one which detects only the interruption and exception. Even in this case, a microcomputer can perform a normal operation, if an instruction conversion apparatus is set so that it inserts an instruction for resetting the power control register just after a branching instruction.

A PCR condition reset circuit 606 may be the one which detects the interruption, branch, exception, based on the result 609 of decoding by instruction decoder.

Furthermore, a PCR condition reset circuit 606 may be the one which detects the interruption, branch, exception, on the basis of both the result 609 of decoding by instruction decoder and the factor signal 607. Use of the both items together for the detection contributes to make the interruption, branch, exception detection more reliable, as compared to a detection which is conducted based on either one of the two items.

Figure 8:
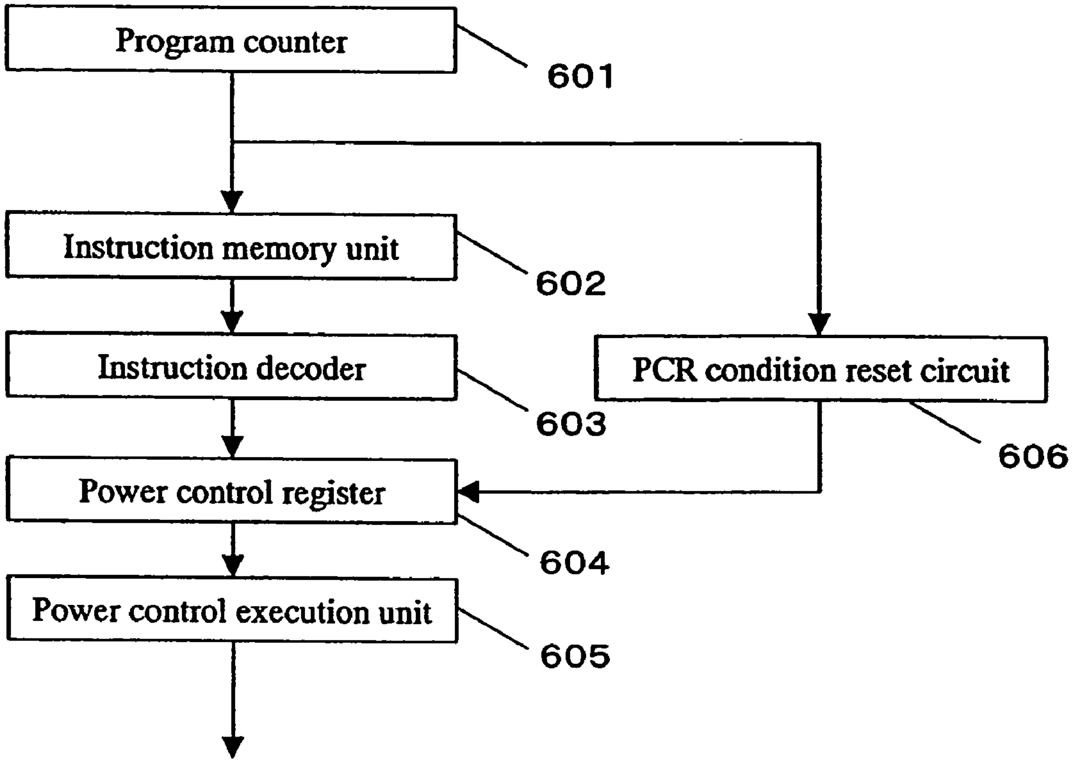
FIG. 8 shows other microprocessor in accordance with a first exemplary embodiment of the present invention.

Still further, a PCR condition reset circuit 606 may be the one which conducts the interruption, branch, exception detection based on a change in the condition of program counter, as shown in FIG. 8.

Embodiment 2

A second exemplary embodiment of the present invention is described referring to the drawings.

Figure 9:
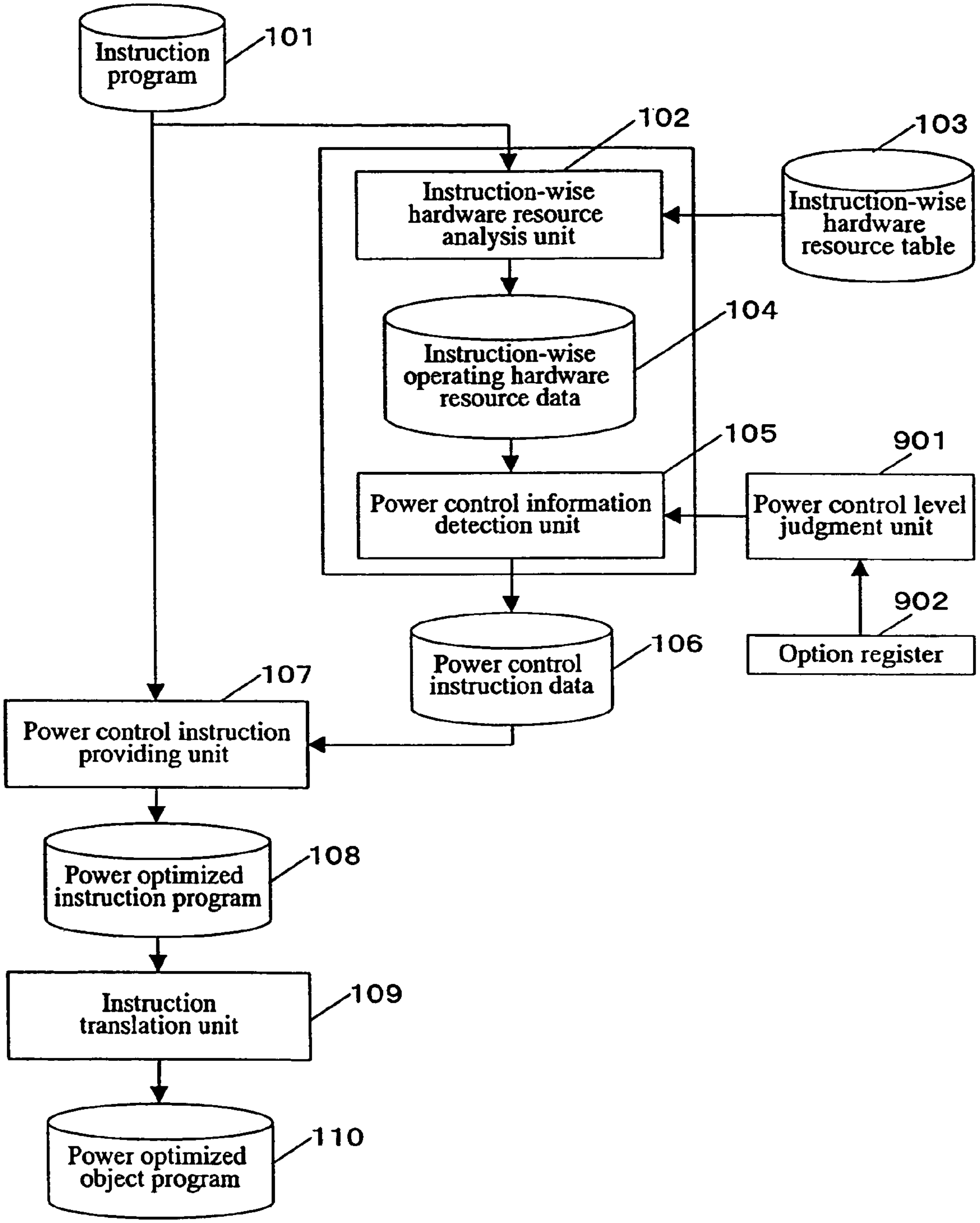
FIG. 9 shows an instruction conversion apparatus in accordance with a second exemplary embodiment of the present invention.

FIG. 9 shows an instruction conversion apparatus in accordance with the second exemplary embodiment. In FIG. 9, those constituent components identical to those of FIG. 1 are represented by using the same symbols. When an instruction is inserted for the purpose of power control, it increases the code size of a machine language program, which is eventually mounted in a microprocessor. It also increases the instruction execution cycle to impair the processing speed of microprocessor. In some cases, a user may put preference on the code size or the processing speed to the low power consumption. A second embodiment of the present invention addresses the above-described issue; namely, a user is provided with an option to select a level of power control at the time when assembling or compiling is made. A user attaches an option, "−P1" or "−P2", at the assembling or compiling. The option inputted by the user is stored in an option register 902. A power control level judgment unit 901 refers to the value of option register 902, and outputs the result of reference to the power control information detection unit 105. When option is "−P1", the power control information detection unit 105 detects a hardware resource which does not operate for three or more regions; when option is "−P2", it detects a hardware resource which does not operate for five or more regions to provide the power control instruction data 106.

So according to instruction-wise operating hardware resource data of FIG. 4, when option is "−P1", "Memory Read Operation" is detected as hardware resource which does not operate for more than three regions (from SUB instruction to STR instruction). But when option is "−P2", "Memory Read Operation" is not detected.

In the above-described structure, where a user can select at option a desired level of the power control, number of instructions to be inserted for the power control can be adjusted. Therefore, a user can adopt an optimum level of the power control taking the code size and the execution cycle into consideration.

A power control level judgment unit 901 is not limited to the one having the above-described structure, in which the level of power control is judged by an option. Any other unit would do, in so far as it allows a user to specify a level of the power control at his or her judgment among a plurality of levels. Although the power control information detection unit 105 in the present embodiment 2 controls the level of power control by changing the length of instruction region which is to be judged haltable, method of adjusting the level is not limited to the one described above. An example of other method is; conducting the detection on all of the hardware resources when option is "−P1", while conducting the detection only on the memory and the data register when option is "−P2". That is to say, the power control information detection unit 105 changes which hardware resources are targets for the power control in accordance to a level of the power control.

In a case where the power control instruction providing unit 107 is capable of doing both the instruction insertion and the replacement, it may be structured so that it conducts both the insertion and the replacement when option is "−P1", while only the replacement when option is "−P2". Since neither the code size nor the execution cycle is increased by the replacement, the option "−P2" provides only a minimum power control, which does not accompany any disadvantage.

Embodiment 3

A third exemplary embodiment of the present invention is described referring to the drawings.

Figure 10:
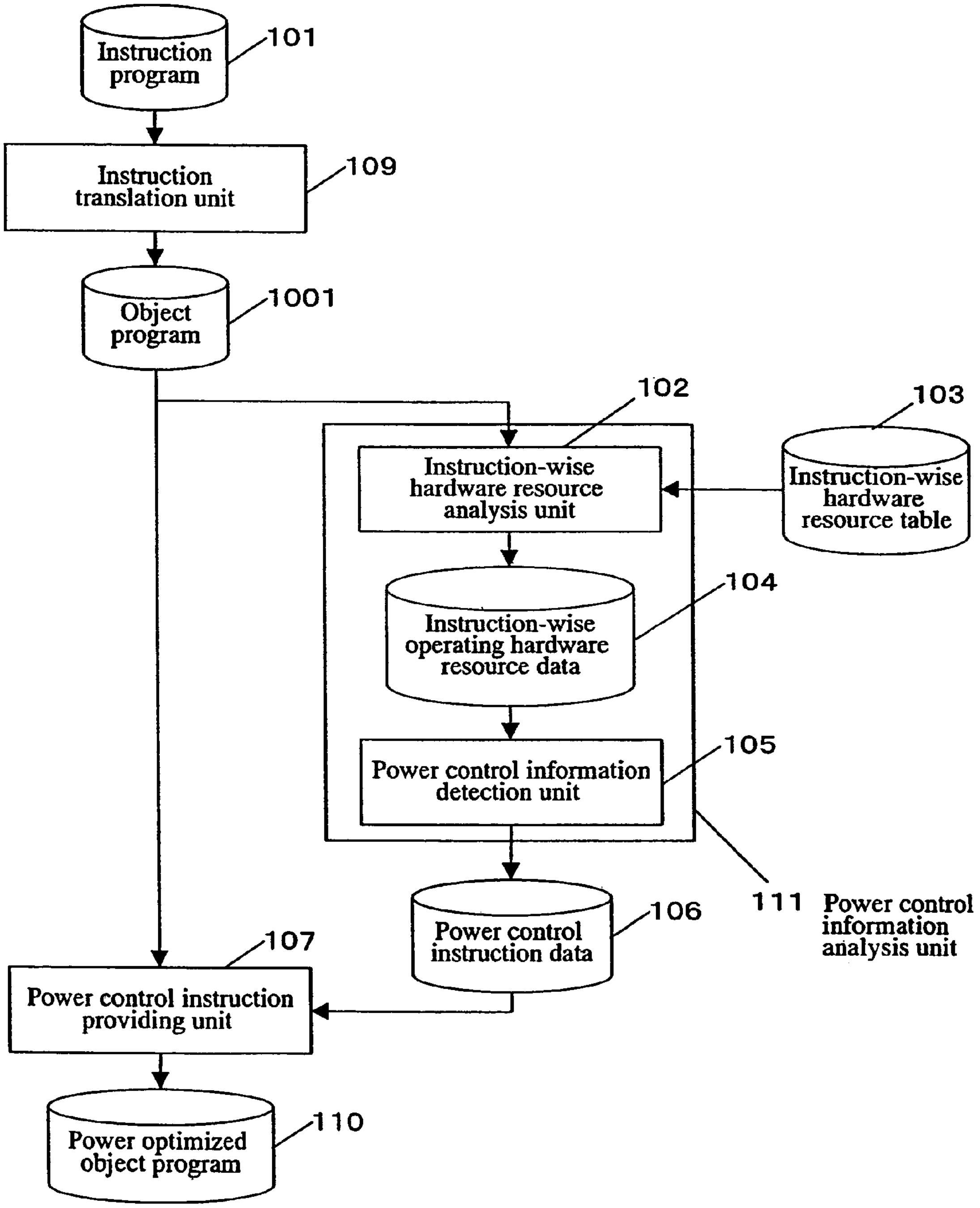
FIG. 10 shows an instruction conversion apparatus in accordance with a third exemplary embodiment of the present invention.

FIG. 10 shows an instruction conversion apparatus in accordance with the third exemplary embodiment. In FIG. 10, those constituent components identical to those of FIG. 1 are represented by using the same symbols. In the first embodiment, a power optimized instruction program 108 is generated by providing an instruction program described by a user with an instruction regarding the power control, by means of insertion or replacing. In the present embodiment, however, an instruction program 101 described by a user is first translated by an instruction translation unit 109 into an object program 1001, which being a row of machine language instruction for execution by a microprocessor. And then, a power optimized object program 110 is generated based on the object program 1001.

Figure 11:
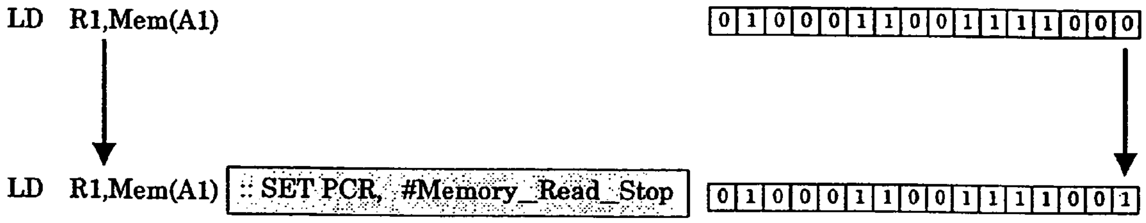
FIG. 11 shows how a machine language instruction is provided with power control information, in the third exemplary embodiment.

In this case, as shown in FIG. 11, an instruction code is provided with an instruction regarding the power control by inserting a power control-related bit in a part of the instruction row described in a machine language at the power control instruction providing unit (107 in FIG. 10). At this stage, it may be difficult for a user to see where a power control instruction is provided, it may be known by de-assembling the power optimized object program 110.

A power control instruction providing unit 107 in the present embodiment 3 is not limited to the one which performs the above-described bit insertion. Any other unit would do, in so far as it provides a power control information based on the power control instruction data 106. It may be, for example, the one which inserts a machine language instruction itself.

An instruction conversion apparatus in the present embodiment 3 may be implemented in the form of a computer program, like the one in embodiment 1. It may be offered to a user of microprocessor either as an assembler/compiler or an independent power control program.

Furthermore, it may be provided with a power control level judgment unit, like in the embodiment 2, so that a user can select a level of the power control.

Since an instruction conversion apparatus in the present embodiment 3 converts an object program as it is, it can be offered to a user as a widely-usable compiler/assembler for optimizing the power consumption, which being independent of the language used at the user for a program description.

A microprocessor in the present embodiment 3 may of course contain a PCR condition reset circuit 606, like in the embodiment 1.

Embodiment 4

A fourth exemplary embodiment of the present invention is described referring to the drawing.

Figure 12:
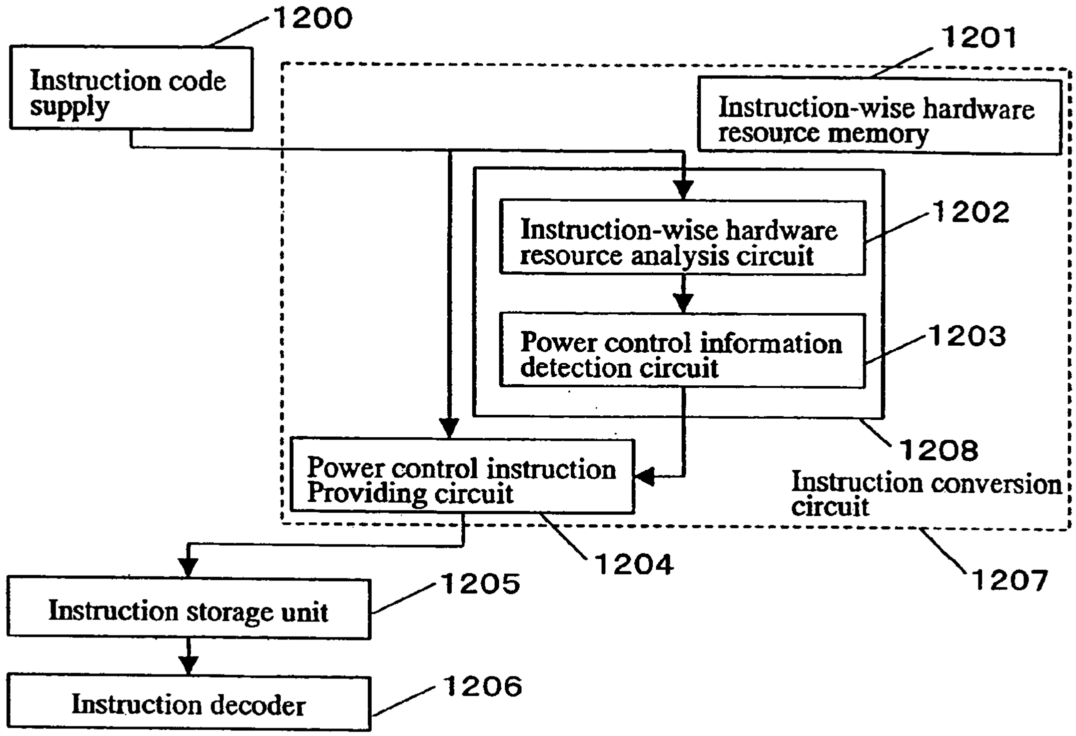
FIG. 12 shows an instruction conversion apparatus in accordance with a fourth exemplary embodiment of the present invention.

FIG. 12 shows the structure of an instruction conversion circuit in accordance with the fourth exemplary embodiment of the present invention. In FIG. 12, an instruction code supply 1200 delivers a non-power optimized object program generated by a conventional method to an instruction storage unit 1205 in a microprocessor. Either a rewritable memory such as a flash memory, or a non-rewritable ROM may be used for the instruction storage unit 1205. The object program was conventionally delivered direct to the instruction storage unit 1205. In the present embodiment 4, however, it is delivered to the instruction storage unit 1205 after going through an instruction conversion circuit 1207 of the present invention and rewritten into a power optimized object program. The instruction conversion circuit 1207 comprises an instruction-wise hardware resource memory 1201, an instruction-wise hardware resource analysis circuit 1202, a power control information detection circuit 1203 and a power control instruction providing circuit 1204. The instruction-wise hardware resource memory 1201 is a memory which stores an instruction-wise hardware resource table 103 of the embodiment 1. The instruction-wise hardware resource analysis circuit 1202 corresponds to an instruction-wise hardware resource analysis unit 102 of the embodiment 1. It makes reference to the instruction-wise hardware resource table stored in the instruction-wise hardware resource memory 1201 to judge the operation/halt of a hardware resource at each instruction code, and outputs an instruction-wise hardware resource operation data. The power control information detection circuit 1203 corresponds to a power control information detection unit 105 of the embodiment 1. It extracts, based on the instruction-wise hardware resource operation data outputted from the instruction-wise hardware resource analysis circuit 1202, a hardware resource making a halt for a certain specific instruction region, and outputs a power control instruction data. The power control instruction providing circuit 1204 corresponds to a power control instruction providing unit 107 of the embodiment 1. It provides an object program, which is delivered from the instruction code supply 1200 to the instruction storage unit 1205, with an instruction regarding the power control, based on the power control instruction data outputted by the power control information detection circuit 1203, to generate a power optimized object program. Instruction storage unit 1205 stores the power optimized object program. By executing the power optimized object program, a microprocessor reduces the power consumption.

Thus, an instruction conversion method of the present invention can be implemented also in the form of a circuit.

Embodiment 5

A fifth exemplary embodiment of the present invention is described with reference to the drawing.

Figure 13:
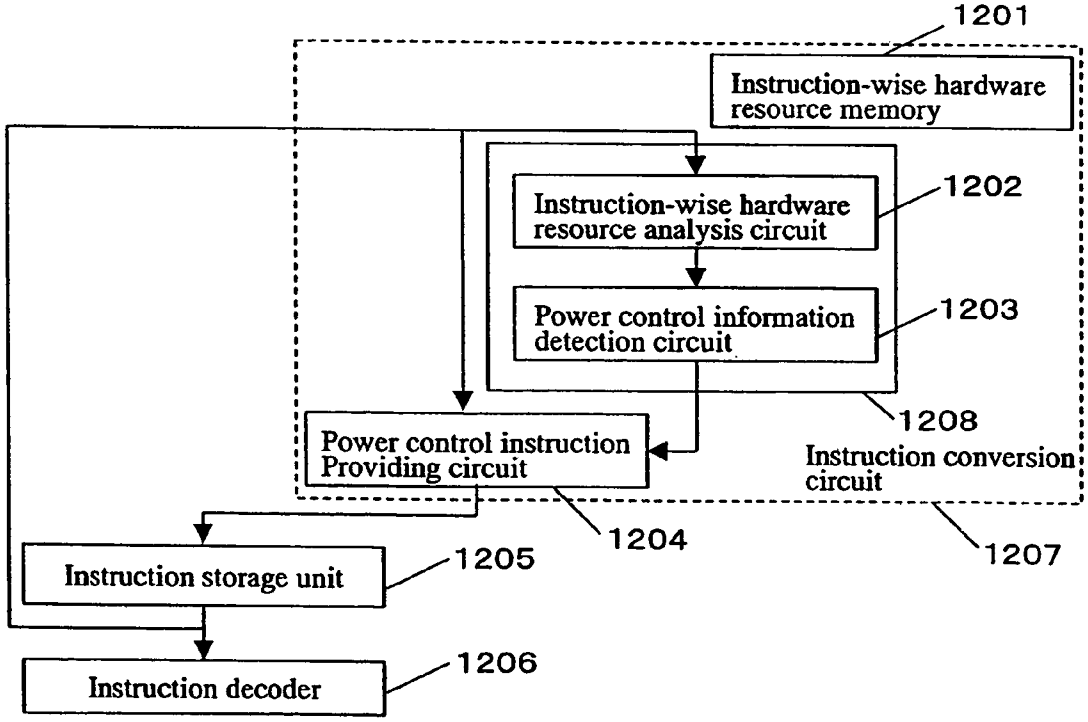
FIG. 13 shows an instruction conversion apparatus in accordance with a fifth exemplary embodiment of the present invention.
Figure 14:
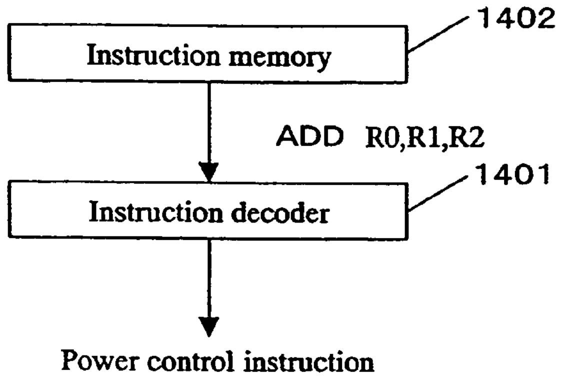
FIG. 14 shows a conventional method of power control through hardware.
Figure 15:
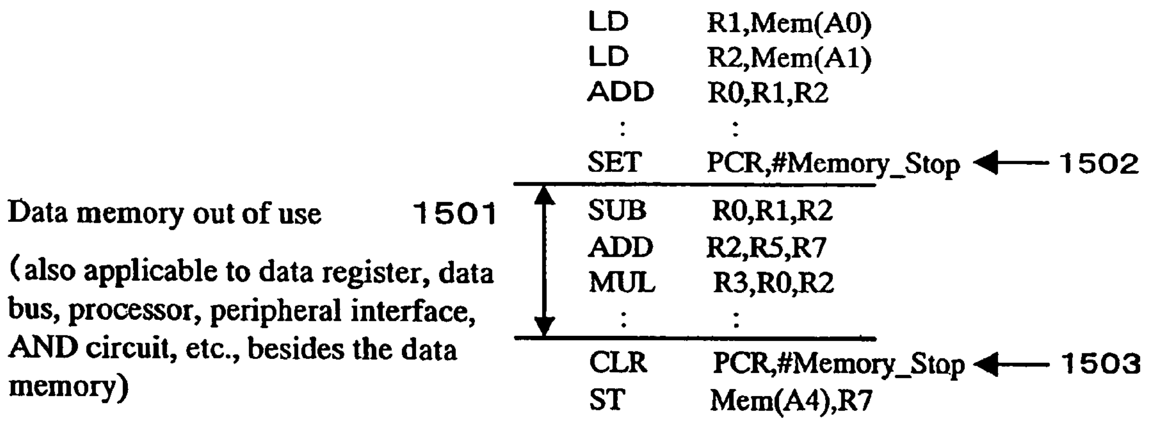
FIG. 15 shows a conventional method of power control through software.

FIG. 13 shows the structure of an instruction conversion circuit in accordance with the fifth exemplary embodiment of the present invention. In FIG. 13, those constituent elements common to those in FIG. 12 are represented by providing the same symbols used in FIG. 11. In the embodiment 4, a power control instruction is provided at the time when an object program is stored from the instruction code supply 1200 to the instruction storage unit 1205. In the present embodiment, however, an object program stored in the instruction storage unit 1205 is delivered direct to an instruction conversion circuit 1207 of the present invention, and then it is stored again in the instruction storage unit 1205 after being provided with an instruction regarding the power control. A point of difference from the embodiment 3 is that an object program already stored in the instruction storage unit 1205 can also be provided with an instruction regarding the power control, in the present embodiment 5. An instruction storage unit 1205 in the present embodiment 5 needs to be a rewritable one.

The embodiment 4 and the embodiment 5 may also be provided with a PCR condition reset circuit. By so doing, the microprocessors can operate normally even when a special instruction sequence has arisen.

The present invention makes it possible to conduct the development of an application program, which being an intrinsic activity, and the power control as separate activities. This alleviates the burden of software development at user. Furthermore, with the present invention, a thorough power control can be implemented easily, maintaining the wide-usabilty of a software and without causing an increase in the software size.

What is claimed is:

1. An instruction conversion apparatus for optimizing an instruction program formed of a plurality of instructions to be suitable for execution by a microprocessor that has a plurality of hardware resources, comprising:

a power control information analysis unit for detecting a power controllable hardware resource that does not operate over a predetermined length of consecutive instructions in said instruction program while said microprocessor is at work;

a power control instruction providing unit for providing said instruction program with an instruction regarding power control of the power controllable hardware resource in relation to the consecutive instructions having the predetermined length, based on the result of the detection made by said power control information analysis unit; and a setting unit for varying the predetermined length of the consecutive instructions, wherein said power control information analysis unit detects a power-controllable hardware which does not operate over the predetermined length of the consecutive instructions set by the setting unit.

2. An instruction conversion apparatus for optimizing an instruction program formed of a plurality of instructions to be suitable for execution by a microprocessor that has a plurality of hardware resources, comprising:

a power control information analysis unit for detecting a power controllable hardware resource that does not operate for a certain specific instruction region having a predetermined length in said instruction program while said microprocessor is at work;

a power control instruction providing unit for providing said instruction program with an instruction regarding the power control of the power controllable hardware resource in relation to the certain specific instruction region having the predetermined length, based on the result of the detection made by said power control information analysis unit; and a setting unit for varying the predetermined length of the certain specific instruction region, wherein said power control information analysis unit detects a power-controllable hardware which does not operate for the certain specific instruction region having the predetermined length set by the setting unit.

3. An instruction conversion method for optimizing an instruction program formed of a plurality of instructions to be suitable for execution by a microprocessor, comprising the steps of:

setting a length of consecutive instructions in said instruction program, over which power control is performed for a power controllable hardware resource;

detecting the power controllable hardware resource which does not operate over the length of consecutive instructions set by the setting step; and providing said instruction program with an instruction regarding the power control of the power controllable hardware resource in relation to the consecutive instructions having the length, based on the result of said detecting step.

4. The instruction conversion method according to claim 3, further comprising the step of varying the length of consecutive instructions, over which power control is performed for a power controllable hardware resource.

* * * * *